UNITED STATES PATENT OFFICE.

CHARLES E. TEETS, OF NEW YORK, N. Y.

IMPROVEMENT IN STOVE-POLISHES.

Specification forming part of Letters Patent No. 171,490, dated December 28, 1875; application filed November 10, 1875.

*To all whom it may concern:*

Be it known that I, CHARLES E. TEETS, of the city, county, and State of New York, have invented a new Stove-Polish, the same being a new composition of matter, of which the following is a specification:

My new stove-polish is composed of the following ingredients, in the proportions, or about the proportions, named: Plumbago, twenty-five pounds; common bar-soap, six pounds; resin, two pounds; and black varnish, three-fourths of a pound.

These ingredients are put together to compose my new stove-polish by dissolving the soap in boiling water, using only water sufficient for the purpose; then add the resin, and boil the whole until thoroughly melted and mixed; then, adding the plumbago, stir it into the mass, and then add and stir in the varnish until the whole is thoroughly commingled. If the varnish is too thick for convenient mixing it may be thinned by adding to it benzine. If preferred, some suitable substance may be added to give the polish an agreeable odor.

I have described what I regard as the preferable method and order of putting and incorporating together the ingredients named to constitute my stove-polish; but I do not, of course, limit myself to such precise order of method; any other which will result in their complete incorporation and mixture may be employed.

This polish may be put up for sale and use in boxes similar to shoe-blacking in common use.

What I claim as my invention, and desire to secure by Letters Patent, is—

A paste stove-polish composed of hard soap, plumbago, resin, and varnish, as described.

Witness my hand this 6th day of November, 1875.

CHARLES E. TEETS.

Witnesses:
    B. S. CLARK,
    FRED. E. BOND.